United States Patent
Wünning et al.

(10) Patent No.: US 12,241,626 B2
(45) Date of Patent: Mar. 4, 2025

(54) METHOD AND DEVICE FOR FLAMELESS STEPWISE COMBUSTION

(71) Applicant: WS-WÄRMEPROZESSTECHNIK GMBH, Renningen (DE)

(72) Inventors: Joachim G. Wünning, Leonberg (DE); Joachim A. Wünning, Leonberg (DE)

(73) Assignee: WS-WÄRMEPROZESSTECHNIK GMBH, Renningen (DE)

( * ) Notice: Subject to any disclaimer, the term of this patent is extended or adjusted under 35 U.S.C. 154(b) by 968 days.

(21) Appl. No.: 17/292,810

(22) PCT Filed: Nov. 8, 2019

(86) PCT No.: PCT/EP2019/080635
§ 371 (c)(1),
(2) Date: May 11, 2021

(87) PCT Pub. No.: WO2020/099254
PCT Pub. Date: May 22, 2020

(65) Prior Publication Data
US 2022/0026058 A1    Jan. 27, 2022

(30) Foreign Application Priority Data
Nov. 12, 2018  (EP) ..................................... 18205667

(51) Int. Cl.
*F23C 6/04* (2006.01)
*F23N 1/02* (2006.01)
*F23C 9/00* (2006.01)

(52) U.S. Cl.
CPC ................ *F23C 6/042* (2013.01); *F23N 1/02* (2013.01); *F23C 9/006* (2013.01); *F23C 2900/99001* (2013.01)

(58) Field of Classification Search
None
See application file for complete search history.

(56) References Cited

U.S. PATENT DOCUMENTS

| | | |
|---|---|---|
| 3,309,866 A | 3/1967 | Kydd |
| 4,405,587 A | 9/1983 | McGill et al. |
| | (Continued) | |

FOREIGN PATENT DOCUMENTS

| | | |
|---|---|---|
| CN | 1142587 A | 2/1997 |
| CN | 1185171 A | 6/1998 |
| | (Continued) | |

OTHER PUBLICATIONS

"Cool Flame", Wikipedia, https://en.wikipedia.org/wiki/Cool_flame. *

(Continued)

*Primary Examiner* — Jason Lau
(74) *Attorney, Agent, or Firm* — Fitch, Even, Tabin & Flannery LLP

(57) ABSTRACT

A method for heating a heating chamber to a temperature below the spontaneous ignition temperature of the fuel that is used, wherein fuel and air are reacted in flameless oxidation in a non-stoichiometric mixture ratio in a combustion chamber. The air ratio $\lambda$ is at least lower than the stoichiometric ratio $\lambda=1$ such that the temperature in the combustion chamber does not exceed the temperature at which thermal nitrous oxide generation begins. Otherwise, $\lambda$ is established such that the spontaneous ignition temperature of the fuel is exceeded. This results in two permissible air ratio ranges, between $\lambda_{min}$ and $\lambda_1$ in sub-stoichiometric operation, and $\lambda_2$ to $\lambda_{max}$ in superstoichiometric operation of the combustion chamber. The still-reactive gases released from the combustion chamber are made to react in the heating chamber, preferably by flameless oxidation. This avoids thermal nitrous oxide generation in the heating chamber.

7 Claims, 2 Drawing Sheets

(56) References Cited

U.S. PATENT DOCUMENTS

| | | | |
|---|---|---|---|
| 5,154,599 A | 10/1992 | Wunning | |
| 5,727,378 A | 3/1998 | Seymour | |
| 6,234,092 B1 | 5/2001 | Domschke et al. | |
| 6,793,693 B1* | 9/2004 | Koehne | F23D 11/404 |
| | | | 44/457 |
| 7,029,271 B2* | 4/2006 | Wunning | F23L 15/02 |
| | | | 126/91 A |
| 7,062,917 B2 | 6/2006 | Wunning et al. | |
| 8,911,230 B2 | 12/2014 | Wünning et al. | |
| 9,745,890 B2 | 8/2017 | Eberspach | |
| 2003/0079665 A1 | 5/2003 | Atreya | |
| 2005/0186522 A1 | 8/2005 | Goldman | |
| 2005/0271990 A1 | 12/2005 | Lifshits | |
| 2014/0000551 A1* | 1/2014 | Eberspach | F02B 19/00 |
| | | | 123/253 |
| 2016/0354746 A1 | 12/2016 | Nold | |

FOREIGN PATENT DOCUMENTS

| | | |
|---|---|---|
| CN | 1206465 A | 1/1999 |
| CN | 1507528 A | 6/2004 |
| CN | 1791767 A | 6/2006 |
| CN | 101163918 A | 4/2008 |
| CN | 101389905 A | 3/2009 |
| CN | 101874180 A | 10/2010 |
| CN | 103930721 A | 7/2014 |
| CN | 104100374 A | 10/2014 |
| CN | 104272026 A | 1/2015 |
| CN | 105387471 A | 3/2016 |
| CN | 105980040 A | 9/2016 |
| CN | 106338086 A | 1/2017 |
| CN | 106979517 A | 7/2017 |
| CN | 107090530 A | 8/2017 |
| CN | 107504487 A | 12/2017 |
| CN | 107580669 A | 1/2018 |
| CN | 112856417 A | 5/2021 |
| DE | 102011087971 A1 | 6/2013 |
| DE | 102014103952 A1 | 9/2015 |
| EP | 0463218 A1 | 1/1992 |
| EP | 0698764 A2 | 2/1996 |
| EP | 2527734 A1 | 11/2012 |
| EP | 1995515 B1 | 10/2013 |
| JP | S55110725 A | 8/1980 |
| JP | 04-09811 A | 3/1992 |
| JP | H05126316 A | 5/1993 |
| JP | H08166108 A | 6/1996 |
| JP | 2000283427 A | 10/2000 |
| JP | 2008527283 A | 7/2008 |
| JP | 2014001910 A | 1/2014 |
| KR | 20110068152 A | 6/2011 |
| RU | 2082915 C1 | 6/1997 |
| RU | 2145050 C1 | 1/2000 |
| RU | 2206835 C2 | 6/2003 |
| RU | 2561760 C1 | 9/2015 |
| RU | 2593736 C2 | 8/2016 |
| SU | 1332100 A1 | 8/1987 |
| WO | 01/11215 A1 | 2/2001 |
| WO | WO-2006024410 A1 * | 3/2006 ............. B01B 1/005 |
| WO | 2009/035334 A1 | 3/2009 |
| WO | 2014083176 A1 | 6/2014 |
| WO | 2017220250 A1 | 12/2017 |

OTHER PUBLICATIONS

Federal Institute of Industrial Property; Office Action for corresponding Russian Patent Application No. 2021116308/12(034354), dated Feb. 10, 2023, 9 pages.

Federal Institute of Industrial Property, Search Report for corresponding Russian Patent Application No. 2021116308/12(034354), dated Feb. 1, 2023; 5 pages.

China National Intellectual Property Administration; Office Action and Search Report in corresponding CN Patent Application No. 201980074303.9, dated Nov. 21, 2023; 20 pages.

Chen, K., et al. "Treatment and Disposal of Waste Flue Gas Denitrification Catalyst for Thermal Power Plants"; Henan Science and Technology Press, Jun. 2017; 16 pages.

Extended European Search Report dated May 3, 2019, in corresponding European Application No. 18205667.1, with machine English translation (12 pages).

International Search Report and Written Opinion dated Dec. 11, 2019, in corresponding International Application No. PCT/EP2019/080635, with machine English translation (15 pages).

Japanese Patent Office; Decision to Grant dated Jul. 18, 2023; 7 pages.

Federal Institute of Industrial Property; Office Action in corresponding Russian Application No. 2021116308/12, dated Jul. 25, 2023; 12 pages.

Federal Service for Intellectual Property Decision to Grant in Corresponding Russian Patent application 2021116308/12, dated Mar. 1, 2024, 14 pages.

Chine State Intellectual Property Office, second office action in correspondence Chinese application No. 201980074303.9, dated Feb. 24, 2024, 14 pages.

* cited by examiner

METHOD AND DEVICE FOR FLAMELESS STEPWISE COMBUSTION

CROSS REFERENCE TO RELATED APPLICATIONS

This patent application is the national phase of PCT/EP2019/080635, filed Nov. 8, 2019, which claims the benefit of European Patent Application No. 18205667.1, filed Nov. 12, 2018.

TECHNICAL FIELD

The invention refers to a method for flameless stepwise combustion and a device therefore.

BACKGROUND

A burner for flameless combustion of a mixture of combustible gas/air for heating water is known from EP 0 698 764 A2. In order to maintain a flameless oxidation in the combustion chamber, an insulation is provided between a water jacket and the inside of the combustion chamber, in order to be able to reach the necessary high temperatures in the combustion chamber for flameless oxidation.

A combustion chamber for a gas turbine is known from WO 01/11215 A1, whereby the combustion chamber operates with a stepwise oxidation. In the combustion chamber a large-scale circulating flow is maintained into which combustion air is sparingly added at different locations. In doing so, a highly stable flame shall be achieved.

A combustion chamber for gas turbines is known from U.S. Pat. No. 7,062,917 B2 that also operates with a large-scale circular flow, but is configured for a stable flameless operation.

U.S. Pat. No. 5,154,599 discloses a burner for heating of a combustion chamber by means of flameless oxidation. A combustion chamber is formed in the burner in which a flame can be ignited. This serves for preheating and heating the furnace chamber, i.e. for start-up of the burner. In the stationary operation the combustion chamber is inactive and the oxidation of the fuel occurs exclusively in the furnace chamber.

The heating of a combustion chamber by means of flameless oxidation at a temperature that is below the otherwise required 850° C. for flameless oxidation is known from EP 1 995 515 B1. For creation and maintenance of the flameless oxidation the burner comprises a combustion chamber in which a flame burns in a stable manner. The hot exhaust gas discharged from the combustion chamber is introduced with air and fuel in the furnace chamber in which then a flameless oxidation of the fuel occurs.

U.S. Pat. No. 3,309,866 describes a gas turbine with flameless oxidizing combustion chamber for oxidation of a gas/air mixture. For this a torus-shaped combustion chamber is provided. A gas/air mixture coming from a carburetor is supplied to this combustion chamber.

Further a gas turbine is known from U.S. Pat. No. 5,727,378, the combustion chamber of which receives a fuel-rich mixture coming from an atomizer and in addition air via a plurality of air supply openings such that a flameless primary mix zone and downstream a combustion zone is formed. The oxidation of the fuel occurs in the combustion zone. Whereas the mix zone serves for atomizing of the fuel. The flame front is displaced away from the mix zone.

U.S. Pat. No. 6,234,092 B1 describes a device for thermal treatment of non-separable liquids that operates with flameless oxidation. The non-combustible liquid to be thermally treated is injected in the furnace chamber heated by flameless oxidation.

In the combustion methods operating with flameless oxidation known from the prior art, the flame creation is suppressed, whereby also the thermal NOx-formation is avoided. Concurrently, burners configured accordingly allow air preheating up to high temperatures, e.g. by use of exhaust gas energy, without thermal NOx-formation thereby. However, a requirement for assurance of a flameless oxidation in a heating chamber is the compliance with a heating chamber temperature that is above the spontaneous ignition temperature of the used fuel including a safety margin. In the following "spontaneous ignition temperature" always means the actual spontaneous ignition temperature in addition with a safety margin that has, for example, an amount of about 150 Kelvin for natural gas. This means that for typical fuels, as e.g. methane (natural gas), that the heating chamber temperature must be above 850° C.

In many applications thus high heating chamber temperatures are not desired, e.g. because the heating chamber serves for heating of sensitive goods that must not exceed distinct limit temperatures. Such applications are, for example, the drying of goods, the annealing of metal articles, brazing of aluminum or another heat treatment of metals, particularly low-melting metals or the vapor creation. The heat creation for such processes is typically based on burners with flame maintenance, in which a thermal NOx-creation is unavoidable.

It is the object of the invention to provide a concept of heat creation for low temperature processes being low in NOx.

SUMMARY

This object is solved with a method and realized with a device as described herein.

The inventive method and the inventive device allow the heating of a heating chamber with a temperature that can also be below the spontaneous ignition temperature of the used fuel (plus safety margin), wherein at least a large portion of the used heat energy is released in a flameless oxidation process. For this an at least two-step oxidation process is provided in which in a first step fuel and air are introduced in a non-stoichiometric ratio in a combustion chamber and are brought into reaction with one another in a flameless oxidation. The combustion chamber is configured substantially adiabatically, i.e. no thermal energy is withdrawn therefrom apart from non-avoidable thermal losses, particularly no useful heat is extracted. Heat extraction occurs substantially only together with the gas stream leaving the combustion chamber, but not in any other way. The gas stream leaves the combustion chamber in a non-cooled manner. The flameless oxidation is achieved in that a large-scale recirculation flow is maintained in the combustion chamber, wherein small local vortices that can be created on flame-maintaining structures, are avoided. The combustion chamber comprises no flame holders or other flame holding structures. All structures are considered as flame-maintaining structures that reduce the velocity of the gas stream thus far and can create small local stationary vortices such that a flame may be maintained on the structure.

The temperature in the combustion chamber is adjusted above the spontaneous ignition temperature of the used fuel. It is, however, maintained below a temperature at which increasingly the formation of nitrogen oxides would have to be noticed. The adjustment of such conditions preferably occurs by means of the fuel/air ratio (briefly: air ratio $\lambda$) in the combustion chamber.

The reaction gas stream discharged from the combustion chamber is supplied to the heating chamber and is completely oxidized there, if necessary under addition of air and/or fuel. The oxidation thereby occurs predominantly in a reaction capable section of the reaction gas stream, the temperature of which is above the spontaneous ignition temperature of the used fuel. In the heating chamber a circulation flow is maintained in which the stream of hot reaction gas mixes with the cooler gas volume contained in the heating chamber. In doing so, sensitive goods can be heated or heat coils of an evaporator can be heated without creating damage of the goods to be heated or the evaporator. Concurrently care is taken that the thermal NOx-creation is largely avoided. Particularly, the oxidation process is controlled in the combustion chamber as well as in the heating chamber such that at no location a temperature limit is exceeded at which an increased nitrogen oxide formation is noticed, as for example 1400° C.

Preferably the oxidation is carried out in the combustion chamber highly sub-stoichiometrically or highly super-stoichiometrically, whereby the temperature is however above the spontaneous ignition temperature of the used fuel, but can be maintained thereby, however far away from the higher temperature required for the formation of nitrogen oxides. For example, the temperature in the combustion chamber can be controlled in a closed loop by means of the air ratio to a temperature within a temperature range of, e.g. 1000° C. to 1300° C. The post-oxidation in the heating chamber by additional air introduction (in case of a sub-stoichiometric combustion chamber) or by fuel introduction (in case of a super-stoichiometric combustion chamber) is thereby preferably also controlled such that temperatures occurring in the post-oxidation zone do not exceed the indicated temperature limit value of 1300° C. to 1440° C. For this the air and/or the fuel required for post-oxidation is introduced in the jet of reaction gases that comes out of the combustion chamber distributed in an area as large as possible. The large-scale distribution of air or fuel in this jet can be achieved in that multiple fuel and/or air nozzles are provided and/or in that the flow velocity and impulses of the reaction gas stream, as well as the fuel stream or air stream required for the post-oxidation, are adapted to one another such that a distribution of air or fuel in the reaction gas jet is achieved before a local complete oxidation can occur.

Preferably an adiabatic process with flameless partial combustion of the used fuel is executed in the combustion chamber. The heat created in the combustion chamber is solely discharged from the combustion chamber and supplied to the heating chamber by the combustion gas flow. While no useful heat is withdrawn from the combustion chamber, the downstream heating chamber serves for extraction of useful heat.

During the operation of the heat creation device a temperature closed loop control is carried out in the combustion chamber, preferably by means of an appropriate definition and adjustment of the ratio between the supplied fuel stream and the supplied air stream. This can be carried out based on the mass flows or the volume flows.

In full load operation the combustion chamber is preferably operated sub-stoichiometrically, wherein an increase of the temperature is countered by a reduction of the air ratio $\lambda$. In the partial load operation the combustion chamber can also be operated super-stoichiometrically, whereby an increase of the temperature is countered preferably by an increase of the air ratio $\lambda$.

The transition from the sub-stoichiometric to the super-stoichiometric operation, e.g. for adaption to a load change, is preferably carried out under avoidance of a range for the air ratio $\lambda$ that is close to $\lambda=1$. For example, a range can be defined around $\lambda=1$, for example from $\lambda=0.8$ to $\lambda=1.6$ in which the control device does not allow a continuous operation. This range is indicated only by way of example and can be defined differently, depending on the fuel.

Due to avoidance of such an operation range, overheating of the combustion chamber and thus also an undesired NOx-formation can be effectively avoided.

In the inventive method and the inventive device the heat power to be created is preferably predominantly created in the adiabatically operated combustion chamber in which the fuel is oxidized in a flameless manner. This occurs preferably sub-stoichiometrically, because a smaller gas volume flow is obtained compared with the super-stoichiometric operation. The adiabatic reaction temperature of the supplied fuel/air mixture is preferably maintained below a limit value of, for example 1400° C. If the fuel is natural gas, the air ratio $\lambda$ is, for example near 0.5. The average gas temperature in the combustion chamber is then remarkably below the indicated limit value.

In the downstream heating chamber the hot reaction gases from the combustion chamber and air or fuel are supplied such that a large-scale recirculation flow is created in the heating chamber in which preferably a flameless combustion occurs. The high temperature of the reaction gases from the combustion chamber guarantees the combustion in the heating chamber, although the temperature of the heat-receiving medium or the goods to be heated, as well as the average heating chamber temperature is below the spontaneous ignition temperature of the used fuel. Subsequent to the reaction gas passage out of the combustion chamber a zone of increased temperature is maintained in the heating chamber that is above the spontaneous ignition temperature of the fuel and that is surrounded by zones of lower temperature, the temperatures of which are below the spontaneous ignition temperature.

The inventive method is also suitable for combustion of so-called lean gases that create difficulties in the flame stabilization, particularly in case of changing compositions.

BRIEF DESCRIPTION OF THE DRAWINGS

In the drawings embodiments of an inventive device are illustrated. The drawings show.

DETAILED DESCRIPTION

Figure 1:
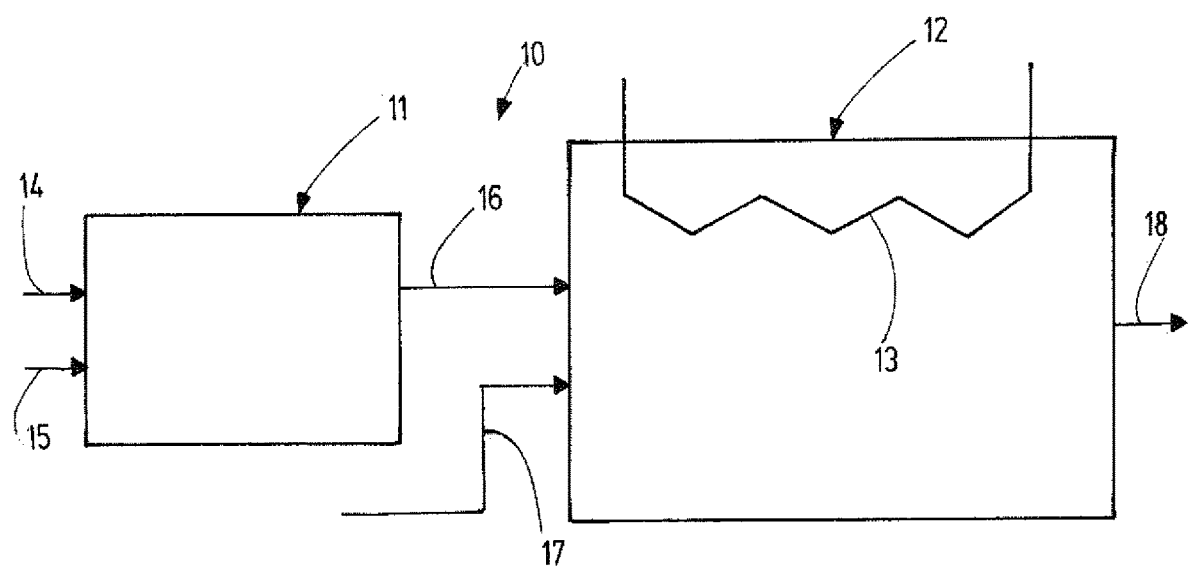
FIG. 1 an inventive device in schematic illustration.

For clarification of the inventive method reference is made to the device 10 according to FIG. 1 that comprises a combustion chamber 11 that is thermally insulated against heat losses and a heating chamber 12 from which useful heat can be extracted. The heat withdrawal from the heating chamber 12 can be executed by heat extraction, e.g. via a heating coil 13 in which a heat carrier fluid is heated or evaporated or by other technical means. For example, the heating chamber 12 can be used for drying of products, for heating of products, e.g. for soldering or for other purposes that require a heating of fluids or objects on moderate temperatures that can be below the spontaneous ignition temperature of a used fuel, e.g. 850° C.

The combustion chamber 11 is supplied with fuel and air via a fuel line 14 and an air line 15. The ratio of fuel and air is thereby defined such that the air ratio is $\lambda=1$. Preferably $\lambda$ is remarkably smaller than 1, i.e. the operation is executed in excess of fuel. For initiating the oxidation in the combustion chamber 11, it is preferably provided with a not further illustrated ignition device, e.g. with a spark ignition device or a pilot burner. It can be operated in continuous operation or can also be turned off after the flameless oxidation in the combustion chamber 11 has been established.

Preferably, the wall of the combustion chamber 11 comprises a high heat resistance. For example, the combustion chamber 11 can be lined with ceramic or can consist of ceramic. In doing so a quick heating of the combustion chamber 11 and a quick attainment of an operation manner with flameless oxidation shall be allowed after the ignition of the fuel in the combustion chamber 11.

The reaction gases created in the combustion chamber are introduced in the heating chamber 12 via a reaction gas passage 16. In addition, air and/or fuel are introduced in the heating chamber 12 via a line 17 in order to mix with the hot reaction gases there and to effect a complete oxidation of the used fuel. The heating chamber 12 is preferably remarkably larger than the combustion chamber 11, wherein an average temperature is obtained in the heating chamber 12 that is remarkably lower than in the combustion chamber 11 and that can be preferably also below the spontaneous ignition temperature of the used fuel. The created exhaust gases are discharged via a line 18 from the heating chamber 12.

Preferably the combustion chamber 11 is operated in a temperature range that is at least such high that the spontaneous ignition temperature of the used fuel is exceeded, whereby it is however concurrently so low that the nitrogen oxide formation is nearly completely suppressed. The useable temperature range in the combustion chamber 11 can be, for example, defined such that the lower temperature limit is between 800° C. and 1100° C., preferably 850° C. and 1100° C., whereas the upper temperature limit is, for example, between 1100° C. and 1400° C., preferably 1100° C. and 1300° C. and has, for example, an amount of 1200° C. The desired temperature range is preferably adjusted by a respective definition or regulation of the air ratio $\lambda$. Thereby the combustion chamber 11 operates, for example (and preferably), in excess of air. In doing so, comparably small constructions of the combustion chamber 11 can be achieved. In addition, the impulse of secondary air that has to be supplied via line 17 and that is required for the complete oxidation is available for establishment of a large-scale and sufficiently quick recirculation flow in the downstream heating chamber 12.

The temperature in the combustion chamber 11 depends during adiabatic operation only from the fuel/air ratio, i.e. the air ratio, and thus from the cross-section ratio of the air inlet nozzles of the combustion chamber 11 and secondary air nozzles in the heating chamber 12. In case of a ratio of, for example, 1:1, which corresponds to an air shortage of about 50%, a temperature of about 1100° C. is achieved with natural gas as fuel in the nearly adiabatic combustion chamber 11. In addition, a temperature closed loop control can be established that influences the stoichiometry, i.e. the air ratio in the combustion chamber 11, in order to maintain the temperature in the combustion chamber 11 within a desired range. This is particularly appropriate during use of lean gases with changing calorific value as fuel. Then the temperature in the combustion chamber 11 can be controlled in closed loop via the air ratio $\lambda$.

The control of the temperature in the combustion chamber 11 by appropriate definition of the stoichiometry (of the air ratio $\lambda$) can also be applied for the cold start such that the combustion chamber 11 can be quickly brought to the desired operation temperature of, e.g. 1000° C. For cold start the combustion chamber 11 can be, for example, operated in stoichiometric operation ($\lambda=1$), until the desired temperature is reached, after which the operation is continued in an sub-stoichiometric manner. In order to allow the desired flameless operation in the combustion chamber 11, the combustion chamber 11 is configured for creation of a large-scale recirculation vortex. Flame-holding structures are, however, not present. For this suitable flow guide devices can be arranged in the combustion chamber 11 that support the formation of a recirculation flow.

Flameless operation can also be realized in the downstream heating chamber 12, if required, although the temperature thereof is less than the spontaneous ignition temperature of the used fuel in the area of the heat withdrawing structures, e.g. the heating coil 13. For this reference is made to FIG. 3 in which a schematic longitudinal section of the combustion chamber 11 and the heating chamber 12 is illustrated. In the combustion chamber 11 a recirculation vortex 19 is established by means of a guide device, e.g. in the form of a hollow cylinder in which fuel is oxidized sub-stoichiometrically. The air 20 blown into the heating chamber 12 via the line 17 transmits its impulse on a gas jet 21 that consists of reaction gases discharged from the combustion chamber 11. In this zone in the forming gas jet 21 a flameless oxidation of the fuels that are still present in the gas jet 21 can occur, whereby a further heat release occurs. However, the gas jet 21 mixes in the course of its recirculation in the heating chamber 12 with cooler rest gas that is present there and thus forms cooler zones such that the average temperature in the heating chamber 12 can be below the spontaneous ignition temperature of the used fuel, e.g. below 850° C., in spite of the additional energy release in the gas jet 21.

The device 10 and the method explained based thereon have numerous advantages compared with conventional heating devices, particularly those based on the operation with flame. Due to the operation of the combustion chamber 11 in flameless oxidation and preferably also the heating chamber 12 with flameless oxidation, the thermal NOx-formation can be nearly completely suppressed and thus values of below 10 mg/m$^3$ can be achieved. This applies independent from the temperature of the zones of the heating chamber 12 serving for heat withdrawal that can also be below the spontaneous ignition temperature of the used fuel, e.g. below 850° C.

In the case of use of lean gases with changing calorific value, problems of flame stabilization that are otherwise present can be avoided by operation of the combustion chamber 11 with flameless oxidation. It is shown that the combustion chamber 11 can be adapted to different power ranges of 10 kW to some MW in a manner being identical in construction and cheap.

In the combustion chamber 11 operated without heat withdrawal a temperature can be substantially maintained constant, also during partial load, such that large control ratio is obtained without specific effort.

If the combustion chamber 11 is provided with a heat transition impeding lining, e.g. a ceramic lining, or consists itself of ceramic or another material with a high thermal resistance, the combustion chamber 11 can also operate flamelessly during cold start. With the technique of flameless oxidation local temperature peaks in flames are avoided, which has a material-conserving effect on the combustion chamber 11 as well as the heating chamber 12.

Figure 2:
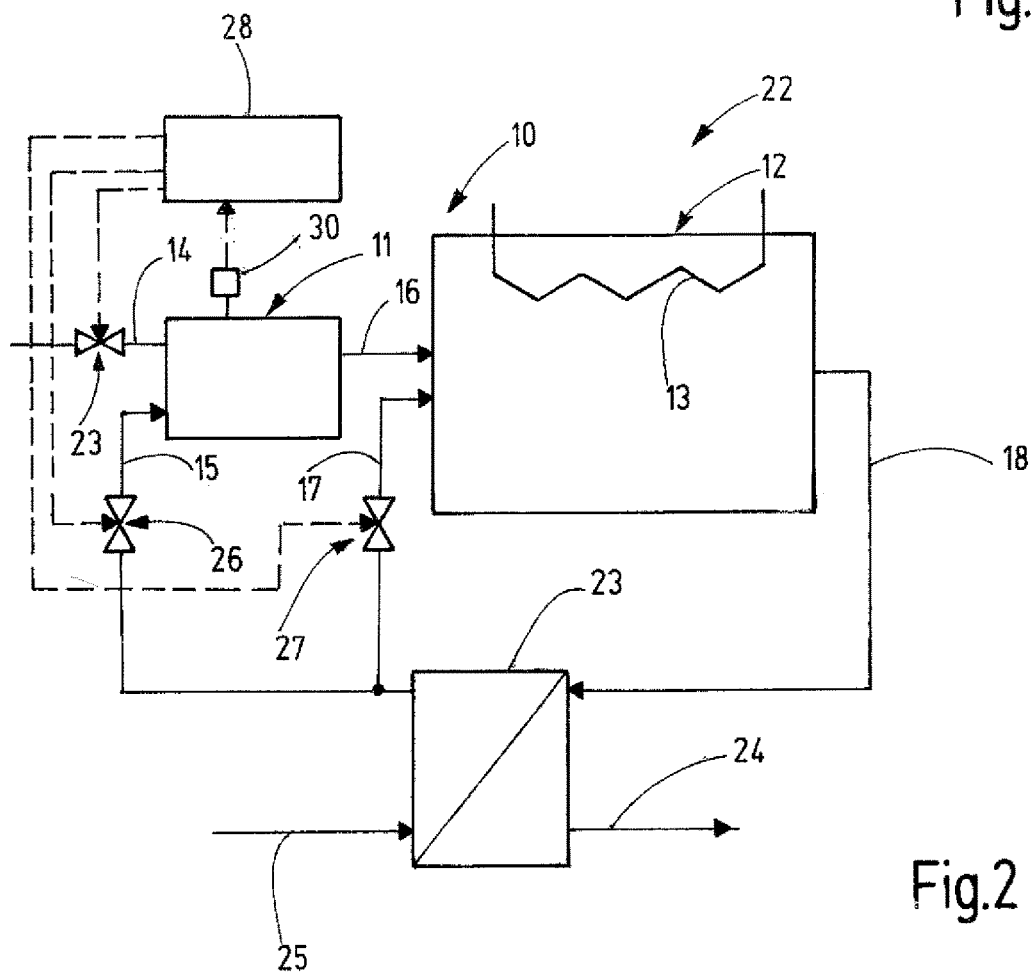
FIG. 2 a modified inventive device in schematic illustration.
Figure 3:
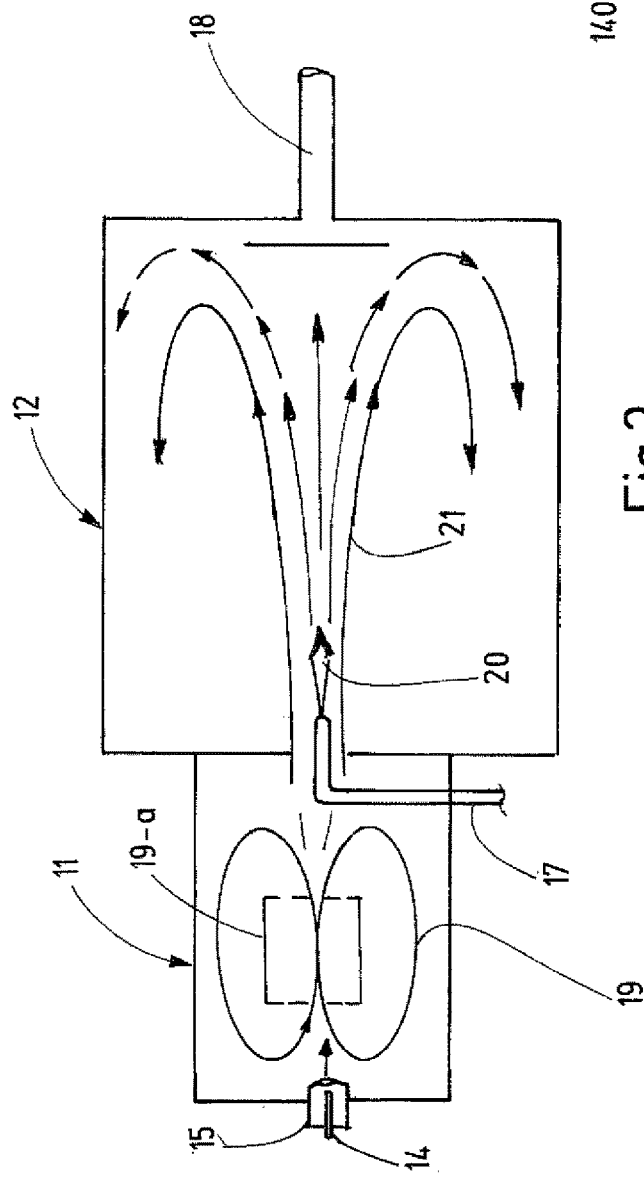
FIG. 3 a combustion chamber and a heating chamber of an inventive device in schematic illustration in longitudinal section, FIG. 4 a diagram for clarification of the load closed loop control of the device according to FIGS. 1 to 3.

FIG. 2 illustrates a system 22 based on the device 10 according to FIGS. 1 and 3, for the description of which reference is made to the above description on the basis of the already introduced reference numerals. In the system 22 a heat exchanger 23 is connected to the exhaust gas line 18 that serves for air preheating and discharges cooled exhaust gas at an outlet 24. The heat exchanger 23 heats fresh air supplied via a fresh air inlet 25 and discharges it to the lines 15 and/or 17 in a heated condition. In at least one of the lines 15, 17 a flow rate regulating device 26, 27 can be provided, e.g. in the form of a slider, a valve, a fan or similar means that influences the flow velocity. The flow rate regulating devices 26, 27 are connected to a control 28. This is in addition connected with a flow rate regulating device 29 that is arranged in the line 14 in order to regulate the fuel flow to the combustion chamber 11. The flow rate regulating device 29 can also be a slider, a valve, a pump, a fan or the like.

The combustion chamber 11 can be provided with a temperature sensor 30 that is connected with control 28. A task of the temperature sensor 30 is the monitoring of the operation of the combustion chamber 11, where usual flame sensors cannot be used due to lack of flames in the flameless oxidation. Preferably the temperature sensor is a "quick" sensor, that means it comprises a remarkably small thermal inertia.

In the system according to FIG. 2, the air supplied to the combustion chamber 11 and/or the heating chamber 12 is preheated by heat exchanger 23. The heat exchanger 23 is, however, optional and also embodiments are possible that do not require this heat exchanger and thus do not require air preheating for the heating chamber 12 and particularly also do not require air preheating for the combustion chamber 11. The temperature required for the flameless oxidation in the combustion chamber 11 results then from the omitted useful heat withdrawal, i.e. the thermal isolation of the combustion chamber 11.

The system 22 illustrated in FIG. 2 can operate, for example as follows:

First, a full load operation is illustrated. For this the control 28 adjusts the fuel flow according to the desired load by means of the flow rate regulating device 29 and then regulates the air flow by means of the flow rate regulating device 26, i.e. the air ratio, such that the temperature in the combustion chamber 11 is in a desired operation range, e.g. between 850° C. and 1300° C., for example at about 1100° C. Thereby a flameless oxidation is achieved in the combustion chamber 11. By means of the temperature sensor 30 the control 28 detects the temperature and reduces the air flow in the air line 15, if the temperature increases above a desired amount and increases the air flow, if the temperature decreases too far. The temperature closed loop control is thus carried out by means of a variation of the air ratio λ in the sub-stoichiometric range. This is apparent from the right section of the abscissa in FIG. 4. The control 28 is thereby in addition configured to not exceed a limit value of $\lambda_1$ in this control range in order to avoid an excessive temperature increase and thus the creation of nitrogen oxide. The control 28 concurrently releases the air flow in the line 17 by means of the flow rate regulating device 27 such that the remaining fuel in the gas jet 21 completely oxides with air 20 in the heating chamber 12. The oxidation occurs preferably flamelessly within the gas jet 21. The latter heats the heating chamber 12 to a temperature below the spontaneous ignition temperature of the used fuel, although the gas jet 21 itself has a temperature above the spontaneous ignition temperature of the fuel. In doing so, also in the heating chamber 12 no thermal NOx-formation is noticed.

During transition into the partial load the control 28 reduces the fuel flow by means of the flow rate regulating device 29 to smaller values. The air ratio λ is thereby adjusted such that the spontaneous ignition temperature is reliably exceeded in the combustion chamber 11. Potentially necessary air for the complete oxidation of still present remaining fuel in the heating chamber 12 is again supplied via line 17.

Figure 4:
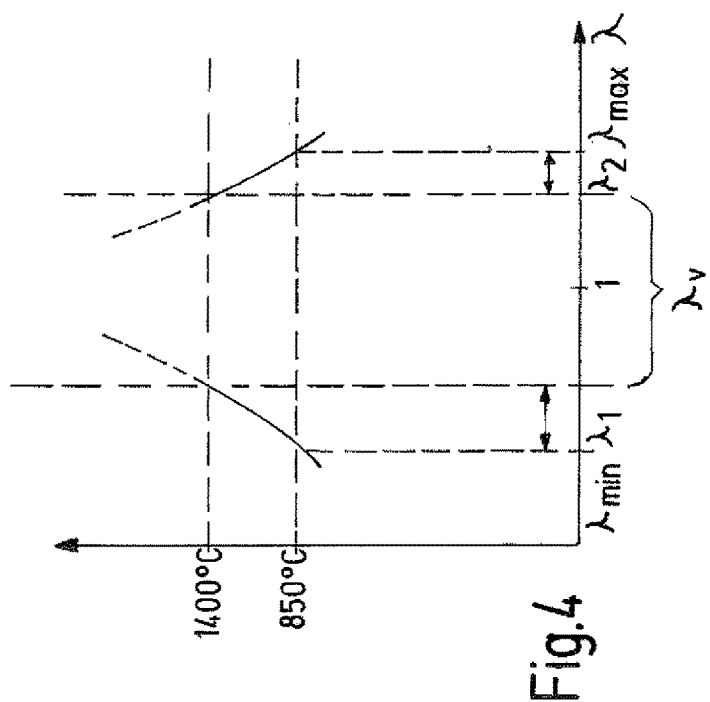

During extreme low load the control can transition from the sub-stoichiometric operation of the combustion chamber 11 described so far to the super-stoichiometric operation thereof, as illustrated in FIG. 4 on the left part of the abscissa above the air ratio limit value $\lambda_2$. While during sub-stoichiometric operation with reduction of the air ratio λ a temperature decrease has been achieved, now during super-stoichiometric operation a temperature decrease is achieved by increase of the air ratio λ. In this range control 28 counters a too high temperature with an increase of the air ratio and a too low temperature of the combustion chamber 11 with a decrease of the air ratio.

The range between the two limit values $\lambda_1$ and $\lambda_2$ is avoided by control 28 at least as soon as the combustion chamber 11 is heated in that this range is passed in a short period during switching from sub-stoichiometric operation to super-stoichiometric operation or is switched without transition from sub-stoichiometric operation to super-stoichiometric operation (and vice versa). In doing so, the increase of the temperature in the combustion chamber 11 above a critical limit value of, e.g. 1300° C. or 1400° C. and the accompanying thermal NOx-formation is avoided.

Numerous modifications can be made to the presented embodiments. For example, the air preheating by means of the heat exchanger 23 can be limited to the air supplied to the combustion chamber 11 via line 15. As an alternative the air preheating can be limited to the air supplied to the heating chamber 12 via line 17. It is also possible to supply a mixture of preheated and not preheated air via line 15 and/or line 17. Further, also a preheating of the fuel supplied to the combustion chamber 11 via line 14 is basically possible. In addition, particularly for sub-stoichiometric operation of the combustion chamber 11 an additional fuel supply can be provided for the heating chamber 12 in order to effectuate an increased ratio of the heat creation in the heating chamber 12. In all presented embodiments it is, however, considered to be advantageous to effectuate the majority of the heat creation in the combustion chamber 11 by means of flameless oxidation. The further oxidation in the heating chamber 12 can be carried out with or without flame, wherein the flameless oxidation allows the decrease of the nitrogen oxide creation down to values below 10 mg/m$^3$.

In the inventive method for heating a heating chamber 12 with a temperature below the spontaneous ignition temperature of the used fuel a combustion chamber 11 is provided in which fuel and air are brought to reaction with one another in flameless oxidation in a non-stoichiometric mixture ratio. The air ratio λ is thereby at least so far away from the stoichiometric ratio $\lambda=1$ that a temperature in the combustion chamber 11 is not exceeded beginning with which a thermal nitrogen oxide creation starts. This temperature is, e.g. 1300° C. to 1400° C. On the other hand the air ratio $\lambda$ is defined such that the spontaneous ignition temperature of the used fuel is reliably exceeded in the combustion chamber 11. Thus, two reliable air ratio ranges are obtained, namely a first range between $\lambda_{min}$ and $\lambda_1$ in the sub-stoichiometric operation and a second range $\lambda_2$ to $\lambda_{max}$ in the super-stoichiometric operation of the combustion chamber 11. The still reactive gases released from the combustion chamber 11 are brought to reaction with additional air and/or additional fuel in a zone of the heating chamber 12, whereby it is preferably carried out with flameless oxidation. The named zone is particularly formed within the gas jet 21. Due to the flameless oxidation, a thermal nitrogen oxide creation is avoided also in the heating chamber 12.

LIST OF REFERENCE SIGNS

10 device
11 combustion chamber
12 heating chamber
13 heating coil
14 fuel line
15 air line
16 reaction gas passage
17 line
18 exhaust gas
19-*a* flow guide device
19 recirculation vortex
20 air
21 gas jet
22 system
23 heat exchanger
24 outlet
25 fresh air inlet
26, 27 flow rate regulating device
28 control
$\lambda$ air ratio
$\lambda_1, \lambda_2, \lambda_{min}, \lambda_{max}, \lambda_v$ air ratio limit values
29 flow rate regulating device
30 temperature sensor The invention caimed is:

1. A method for heating a heating chamber (12), comprising:
   heating the heating chamber (12) to a temperature below a spontaneous ignition temperature of a fuel used to heat the heating chamber;
   reacting fuel and air in flameless oxidation in a non-stoichiometric ratio in a combustion chamber (11); and
   supplying the fuel and air in the heating chamber (12) as a reaction gas without heat withdrawal from the combustion chamber (11) apart from non-avoidable thermal losses;
   wherein the reaction gas is completely oxidized in the heating chamber (12), by adding air and/or fuel as necessary;
   wherein a temperature between 1000° C. and 1300° C. is achieved in the combustion chamber (11) by adjustment or closed loop control of a fuel/air ratio.

2. The method according to claim 1, wherein the oxidation in the heating chamber (12) is carried out with flame formation.

3. The method according to claim 1, wherein the oxidation in the heating chamber (12) is carried out without flame creation by gas guidance with large-scale recirculation.

4. The method according to claim 1, wherein a non-stoichiometric fuel/air ratio is adjusted in the combustion chamber (11) such that a temperature of 1400° C. is not exceeded in the combustion chamber (11).

5. The method according to claim 1, wherein the combustion chamber (11) is sub-stoichiometrically ($\lambda<1$) operated during full load operation and is super-stoichiometrically ($\lambda>1$) operated in a partial load operation.

6. The method according to claim 5, wherein a range ($\lambda_1, \lambda_2$) of non-used fuel/air ratios is defined between a fuel/air ratio in the super-stoichiometric operation and a fuel/air ratio in the sub-stoichiometric operation.

7. The method according to claim 1, further comprising extracting heat from the heating chamber (12).

* * * * *